United States Patent
Faust et al.

[11] Patent Number: 5,821,415
[45] Date of Patent: Oct. 13, 1998

[54] SEAT TESTING PUNCH

[75] Inventors: Eberhard Faust, Stuttgart; Lothar Kassing, Nufringen; Karl Pfahler, Stuttgart; Carsten Mibus, Sindelfingen, all of Germany

[73] Assignee: Mercedes-Benz AG, Stuttgart, Germany

[21] Appl. No.: 786,444

[22] Filed: Jan. 21, 1997

[30] Foreign Application Priority Data

Jan. 20, 1996 [DE] Germany ............... 196 01 971.0

[51] Int. Cl.⁶ .................... A61B 5/00; G01M 19/00
[52] U.S. Cl. .......................... 73/172; 73/865.6
[58] Field of Search .................. 73/866.4, 865.6, 73/432.1, 862.541, 862.381, 172; 364/558

[56] References Cited

U.S. PATENT DOCUMENTS

| | | | |
|---|---|---|---|
| 3,147,617 | 9/1964 | Kaptur, Jr. et al. | 73/172 |
| 3,818,756 | 6/1974 | Barron et al. | 73/172 |
| 3,841,163 | 10/1974 | Daniel | 73/172 X |
| 4,669,302 | 6/1987 | Wagner et al. | 73/172 |
| 4,701,132 | 10/1987 | Groesch et al. | 73/866.4 X |
| 5,253,656 | 10/1993 | Rincoe et al. | 73/172 X |
| 5,379,646 | 1/1995 | Andrzjak et al. | 73/866.4 X |
| 5,528,943 | 6/1996 | Smrcka et al. | 73/866.4 |
| 5,570,301 | 10/1996 | Barrus | 73/172 X |
| 5,628,230 | 5/1997 | Flam | 73/866.4 X |
| 5,641,917 | 6/1997 | Hurite et al. | 73/865.6 X |

FOREIGN PATENT DOCUMENTS

| | | |
|---|---|---|
| 0 646 782 | 4/1995 | European Pat. Off. . |
| 986093 | 3/1965 | United Kingdom . |

OTHER PUBLICATIONS

*SAE 1994 Transactions Journal of Passenger Car*, Section 6, vol. 103, entitled "Simulation of the Hybrid III Dummy Response to Impact by Nonlinear Finite Element Analysis" by T.B. Khalil et al., pp. 1868–1886 (No date).

Primary Examiner—William L. Oen
Attorney, Agent, or Firm—Evenson, McKeown, Edwards & Lenahan, P.L.L.C.

[57] ABSTRACT

A seat testing punch is provided with an upholstered pressure element that can be used as a suitable aid in comfort comparison testing of different test seats to be performed according to strict test criteria, with which seat testing punch various test seats can be loaded in a realistic and reproducible manner as often or for as long as desired. For this purpose, the shape of the pressure element is made to simulate the pelvis and thighs, including the hip joints, of a human skeleton, at least as regards the underside. The upholstery of the pressure element likewise simulates anthropomorphically the soft parts in the area of the buttocks in terms of local distribution of thickness and softness. In particular, the two sitting pressure points of human buttocks and their immediate environment are simulated as naturally as possible in terms of shape, position, hardness, and local hardness distribution.

9 Claims, 3 Drawing Sheets

SEAT TESTING PUNCH

BACKGROUND AND SUMMARY OF THE INVENTION

The invention relates to a seat testing punch with an upholstered pressure element insertable directly into a testing machine.

Seat testing punches of this kind are known for continuous testing of cushions. The punches are pressed by a testing machine with a defined force or defined travel, periodically into a cushion to be tested, in order in this fashion to determine the long-term survival of cushions under severe stress. However, no prior publications on such seat testing punches are known to the applicant.

In the development of seats, especially motor vehicle seats, it is not merely a question of optimizing the service life of the cushions, but in the case of vehicle seats, also of optimizing the sitting comfort because the occupants, and especially the driver, sometimes have to remain seated on vehicle seats for many hours with only limited movement. In this regard, questions of optimum seat pressure distribution and optimum seat climate play a role. In the course of seat development various seat and cushion designs are prepared as trial samples and these must be compared with one another in an objective and reproducible fashion regarding various testing and evaluation criteria, especially as regards comfort and seat climate in order to be able to pick the best trial sample in this way. Not only new trial samples from actual seat development but also various test seats from other sources, for example seats of earlier seat generations, used seats, or seats from outside development for manufacturing facilities, are compared with one another.

European Patent document EP 646 782 A2 teaches a testing device for static load tests of the back rest of motor vehicle seats, with a complete test dummy, a so-called Hybrid III dummy, being used as the seat test body. These are third-generation test dummies that have been largely standardized in a uniform shape in the automobile industry both domestically and abroad for accident simulations. In the test arrangement according to EP 646 782 A2, the test dummy, in the vicinity of the "spinal column" below the thorax area, is gripped by the "hand" of a test machine and pressed with a specific force approximately horizontally into a seat backrest cushion to be tested of a vehicle seat fixed in position. This is done in order to determine the deformation of the substructure of the backrest under powerful stress. The stability and deformation behavior of the backrest is particularly important as regards a possible rear end collision. The backrest must not break off or bend backward under extreme stress, but must support the upper part of the body in an upright position even under these conditions. By means of the known test device, the stability of a backrest can be tested statically with the test dummy in different seated positions. For comfort tests on vehicle seats, especially as regards the seat cushion, the known seat testing device is not only completely unsuited but no suggestions in this regard even follow from this prior art for one skilled in the art. The subject of the test, its purpose, the nature and means of performing the test, and the results of the test are all completely different from the comfort tests with which we are concerned here.

These third-generation test dummies are described for example in SAE 1994 Transactions—Journal of Passenger Cars, Section 6, Volume 103, pp. 1868–1886. They are anthropomorphically designed as regards the mechanical movement behavior and mass distribution of the entire body. As far as individual body regions or limbs are concerned, however, the dummies are in some cases quite rudimentary in design and there can be no question of any details of an anthropomorphic design. This is especially true for the seat part in the pelvic area which is of interest here. This area is completely unimportant for complete dummies, like those used for accident testing, although in that connection, in relationship to the pelvis, the latter consists of a cast aluminum structure whose shape is roughly similar to that of a human pelvic bone structure. This pelvis is enclosed by a soft rubber material in order to approximate the shape of human buttocks, which also contains a three-axis acceleration sensor.

From experience and observation of this everywhere in the pertinent development and testing facilities, on the property of the assignee of the present invention for example, using Hybrid III dummies of several types and of different sizes, it can also be said that the hollow bodies made with double walls that surround the hard parts, for example the soft parts surrounding the pelvic body, are made of a soft rubber whose wall thickness is approximately 3 to 5 mm. The cavity enclosed by the double walls is filled with soft foam. A soft part of this kind is associated with each individual limb: lower leg, upper leg, pelvis, upper body, upper arm, lower arm, and hand. The inside contour of the hollow soft part, slotted lengthwise and closable with a sliding fastener, conforms roughly to the hard parts of the member to be enclosed, i.e. with a certain amount of play, while the outer contour roughly corresponds to the external shape of the body part in question. The soft parts of the individual dummy limbs do not directly adjoin one another; instead, a large gap is left between adjacent soft parts so that the limbs of the test dummy can freely move around. Thus for example, in the transitional area from the upper leg to the buttocks, there is a gap of 3 to 4 cm. In view of the high stresses on the test dummies in simulated accidents and with regard to repeated usability of the dummies in view of there very expensive cost, the soft parts, at least on their exteriors, must exhibit a certain minimum stability and must not be too soft because otherwise these soft parts would be destroyed in accident simulations. The soft parts surrounding the pelvic area in the area of the buttocks have a Shore hardness of approximately 40 to 50 degrees that is largely uniformly distributed over the seat part of the buttocks. The outside shape of the dummy buttocks, unlike the prototype, is relatively flat. For this reason it must be specified that in the area of the buttocks one can speak only of a coarse approximation to the human anatomy, but one that is completely sufficient for use in a test dummy in crash testing, even in a third-generation dummy.

As a result of the only approximately flat simulation of this seat contour, the tilting and sliding behavior that is relevant in the case of a crash for a test dummy seated on a cushion can be approximated with the stability of a real human being when seated. For this however, a surface shape that only approximates the shape of the buttocks is sufficient with a nearly matching elasticity in the buttocks area of the test dummy approximately near the surface. On the basis of the experience gained with the invention, comfort tests on seat cushions of vehicle seats could not be carried out using such a test dummy.

So far, informative and comparable comfort-relevant testing of seats has only been possible to perform using live test subjects. This of course leads only to test results that are subjective and depend on how the individual test subject feels that day, in other words they are inaccurate and not reproducible. In addition, such tests are costly in terms of time and personnel because testing must be performed in a vehicle and by several test subjects in order to get results that show less scatter. The installation of a seat to be tested in the vehicle is likewise time-consuming, especially when comparison testing of seats made by others is involved.

The goal of the invention is to provide a seat testing punch that can be used as a suitable aid in the above-mentioned comfort comparison tests performed under strict test criteria on different test seats and with which various seats can be reproducibly subjected to loads in a realistic manner as often and for as long as desired. It should be mentioned in this connection that the sensorics required for this comparison testing are not part of the present invention. At the present time, we are concerned only with a natural loading of the test cushion.

Details regarding the sensorics, to the extent that they are not already known, can be found in copending application Ser. Nos. 08/779,288, 08/786,446, and 08/786,447, respectively entitled "METHOD AND SYSTEM FOR QUANTITATIVE DETERMINATION OF SEAT CLIMATE ON SEAT CUSHIONS", "METHOD AND DEVICE FOR DETERMINING THE SURFACE CONTOUR IN AN ELASTIC SEAT CUSHION DEFORMABLE UNDER LOAD", and "METHOD FOR QUANTITATIVE DETERMINATION OF THE PRESSURE COMFORT OF A SEAT CUSHION", commonly assigned to the assignee of the present invention, and filed on even date herewith, the specifications of which are herein expressly incorporated by reference.

Taking its departure from the evaluated prior art, this goal is achieved according to the invention by a seat testing punch with a pressure element that is upholstered and points downward in the test position, and can be placed on a seat cushion of a seat to be tested, and with a transition element adjoining the pressure element in the test position at the top, and insertable into a testing machine. The shape of the hard parts of the pressure element of the seat testing punch is modeled after the pelvis and thighs including the hip joints of a human skeleton, at least as regards the underside of the skeleton that is subjected to loads when sitting. The joints of the pressure element that simulate the hip joints are lockable until they do not move under a test load. The upholstery of the pressure element likewise anthropomorphi-cally simulates the soft parts in the vicinity of the buttocks, namely the muscle, connective, and fatty tissue according to softness and local distribution of thickness. The two sitting pressure points of human buttocks and their immediate vicinity in particular are simulated as naturally as possible as regards shape, position, hardness, and local hardness distribution by the pressure element and the upholstery to resemble the skeletal and soft parts.

Accordingly, the seat testing punch is made as naturally similar as possible to the human buttocks and thigh area when sitting as far as the design of the hard and soft parts is concerned.

The following advantages can be achieved with the present invention: (1) the tests proceed under exactly defined measurement conditions; (2) reproducible measurement results are obtained; (3) the measurement results from different seats can be compared easily with one another; (4) the measurements and tests can be performed in the laboratory or in the test garage, in other words it is not necessary to install the seat in the car; (5) Test personnel are spared; (6) measurement and testing of a seat require only about half the time by comparison with testing using test subjects; and (7) measurement series are readily possible.

Other objects, advantages and novel features of the present invention will become apparent from the following detailed description of the invention when considered in conjunction with the accompanying drawings.

DETAILED DESCRIPTION OF THE DRAWINGS

Figure 1:
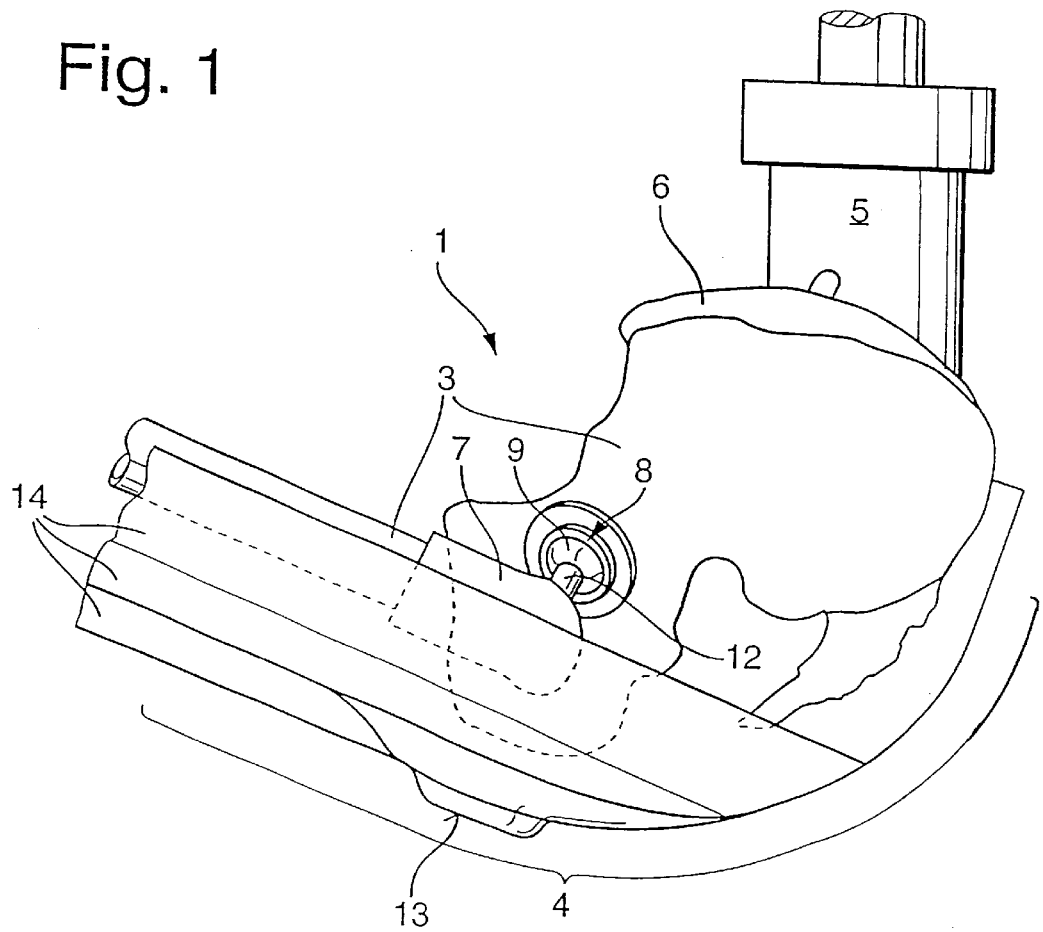
FIG. 1 is a side view of a seat testing punch according to the present invention.
Figure 2:
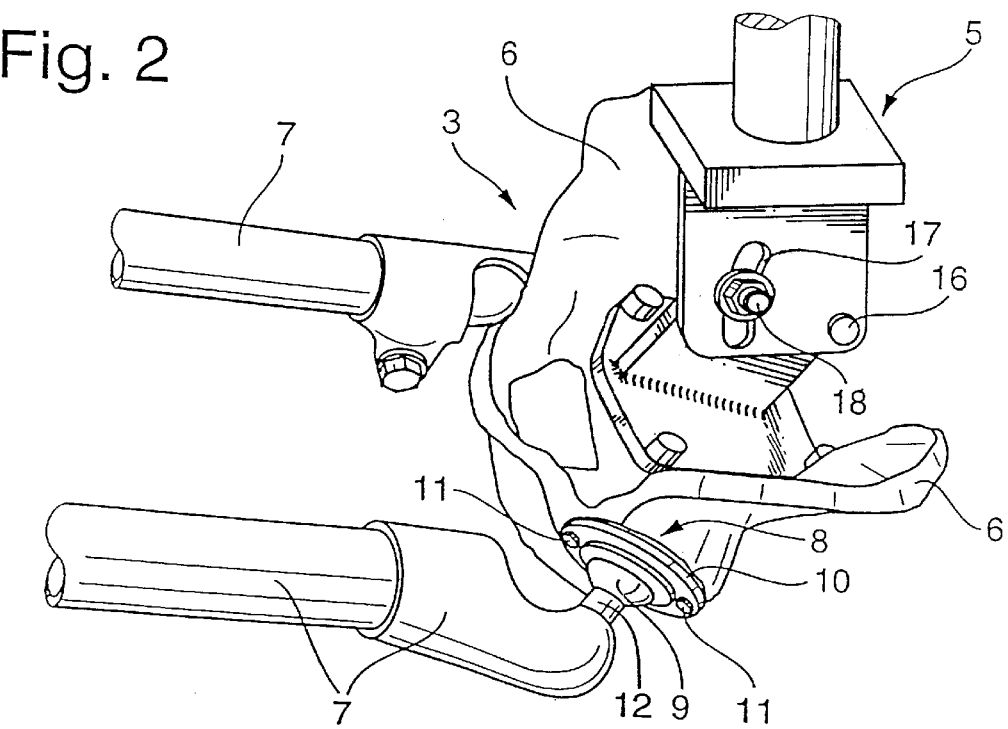
FIG. 2 is a perspective view of the pressure element of the seat testing punch according to FIG. 1.
Figure 3:
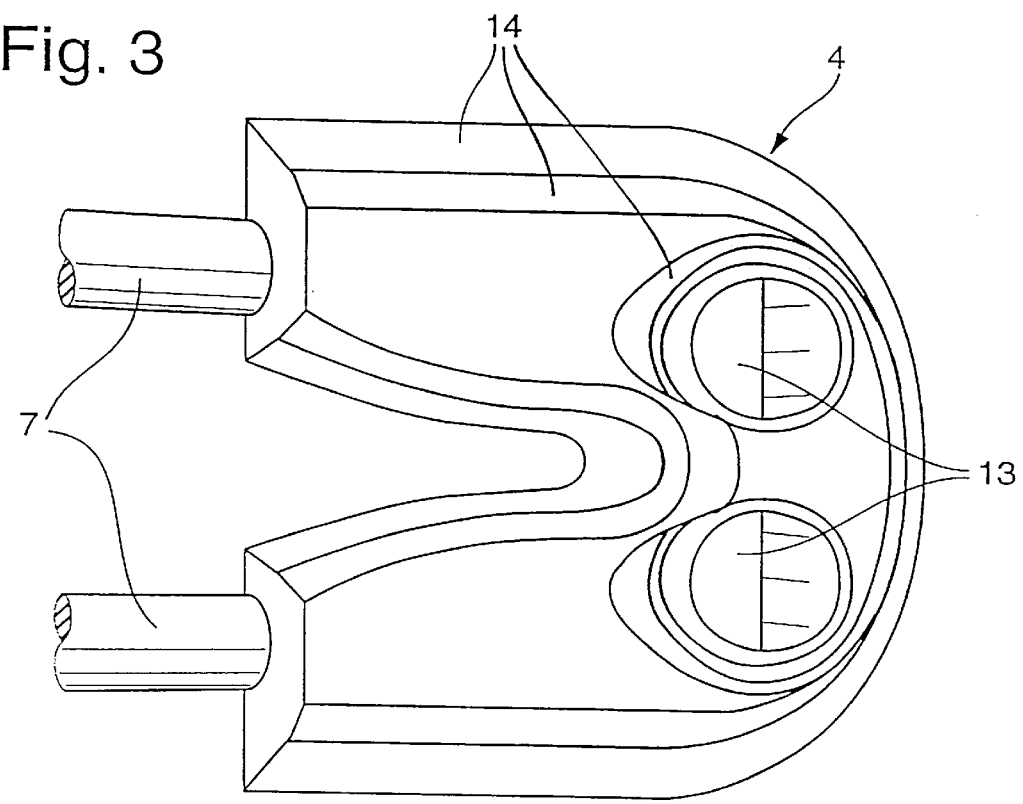
FIG. 3 is a bottom view of the seat testing punch according to FIG. 1.

The embodiment shown in the drawings of a seat testing punch 1 has a pressure element 3 that points downward in the testing position (FIG. 4) and is provided on the other side with upholstery 4, said pressure element being mountable in a test machine 2 at least indirectly, for example with interposition of a pressure measuring mat 20, on a seat cushion 19 of a seat to be tested. A transition element 5 insertable in the test machine adjoins the pressure element 3 at the top.

The seat testing punch 1 is designed to be used as a suitable aid in comfort comparison tests of different test seats that are performed according to strict criteria owing to their reproducibility, so that different seats can be loaded with the seat testing punch 1 in a realistic, reproducible manner as often or for as long as desired. For this purpose, the following design of the seat testing punch is provided.

The shape of pressure element 3 of seat testing punch 1 is modeled, at least in the areas relevant here, to resemble the pelvic and thigh bones, including the hip joints, of a human skeleton. Pressure element 3 consists of a model of a pelvis 6 and a pair of model thighs 7 connected by joints 8 that simulate natural hip joints with the model pelvis 6. Lockable joints 8 are therefore provided so that the relative positions of the thighs and pelvis when seated, as happens during prolonged sitting by a human being, can be simulated and preserved.

Upholstery 4 of the pressure element is made anthropomorphically to resemble the soft parts in the vicinity of the buttocks, namely the muscle, connective, and fatty tissue in terms of its local distribution of thickness and softness. In particular, the two sitting pressure points 13 of human buttocks and their immediate vicinity are simulated as naturally as possible in terms of shape, position, hardness, and local hardness distribution by pressure element 3 and upholstery 4. The upholstery is composed of several elastic soft foam layers 14. In the example, several layers of foam of different thicknesses are used, with the foam layers closer to the pressure element and stretched over a larger area being made stronger than the foam layers in smaller areas located further outward. The individual foam layers have different densities and hence different elasticities. Beginning at thigh supports 13, the elasticity of foam layers 14 increases from the inside to the outside.

Externally, the upholstery 4 is covered with a covering 15 made of a trouser material gathered loosely over the pressure element. In seat testing punches for special studies, it may be advantageous for the pressure element 3 to be covered by a soft leather covering whose flexibility resembles that of human skin.

Joints 8 of pressure element 3 are variable in their resistance to movement all the way to immobility under test loads, so that the test punch can be used as a rigid unit when testing a seat. To tighten the joint, a clamping ring is provided that fits over ball joint 9 and leg neck 12, by means of which the ball ring 9 can be tightened in the socket that receives the ball on the pelvis using a clamping screw 10 until it will not move. By virtue of its intrinsic elasticity and flexible fastening to thighs 7, the upholstery 4 can be made to follow the latter during a position change with respect to pelvis 6 without destruction within a certain range.

Transition element 5 that is insertable in test machine 2 and abuts pressure element 3 at the top has a joint that can be locked firmly and is formed essentially by a pivot pin 16. The joint permits mobility in a plane that is vertical and lies parallel to the thighs, within a certain angle range. As a result, different inclinations of the seat pressure punch to the vertical loading direction can be set. In the upper, machine-side part of the transition element 5, a curved elongate hole 17 concentric with pivot pin 18 is provided, through which a clamping screw 18 passes by which the joint can be tightly clamped. As a result of the resulting angle at the transition element, the size of the angle at which force is applied to the midpoints of the thighs can be set.

Joints 8 of the pressure element 3 and joint 16 of the transition element 5 are aligned and locked in such a way that a realistic distribution of the force over the pelvis and thighs is obtained.

Figure 4:
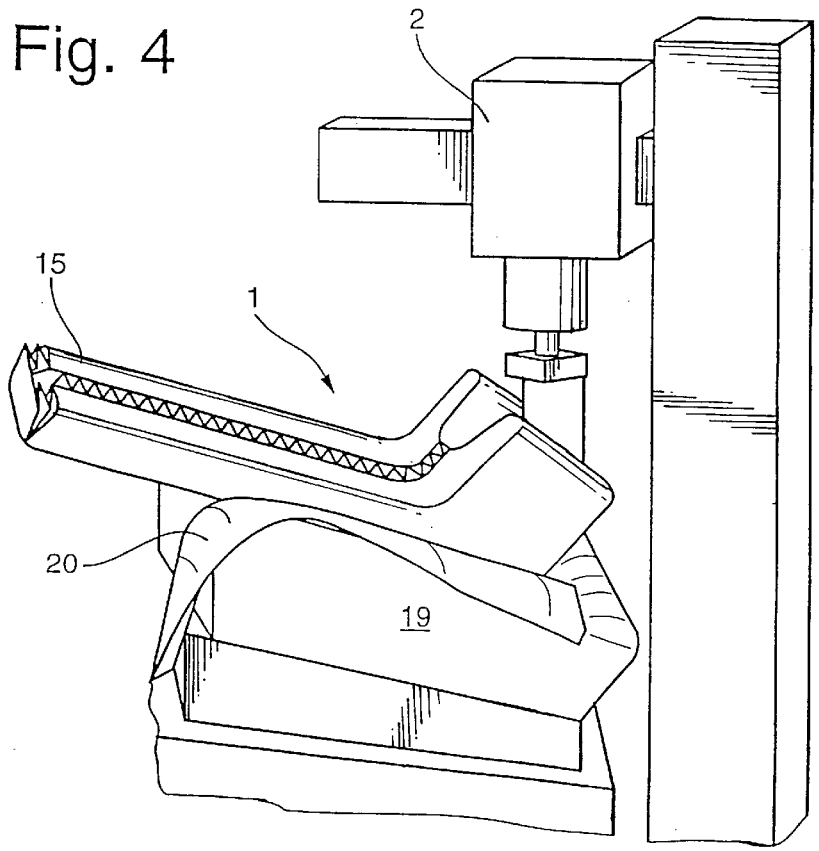
FIG. 4 is a measuring system with a seat cushion to be tested in a testing machine using a seat testing punch according to FIG. 1.

By means of a measuring device like that shown in FIG. 4, a seat cushion 19 can be tested by itself, in other words outside the vehicle, using seat testing punch 1 within the test machine. For this purpose, a thin, flexible measuring mat, for example a pressure measuring mat 20, is placed on the cushion mounted in a specific position. The mat contains a plurality of closely spaced pressure-measuring cells distributed in an orthogonal or hexagonal pattern and a corresponding number of electrical connections that lead to the outside. The seat testing punch 1 is pressed into seat cushion 19 during measurement with a test force whose magnitude can be controlled exactly and which acts vertically, so that the weight of a person to be simulated can be precisely adjusted. It is important to have a uniform loading of the two thigh supports or seat halves. For this reason the test force must be symmetrically applied, i.e. centrally into the simulated pelvis 6 in the seat testing punch 1, and the seat testing punch must likewise be placed symmetrically on the seat to be tested.

Figure 5:
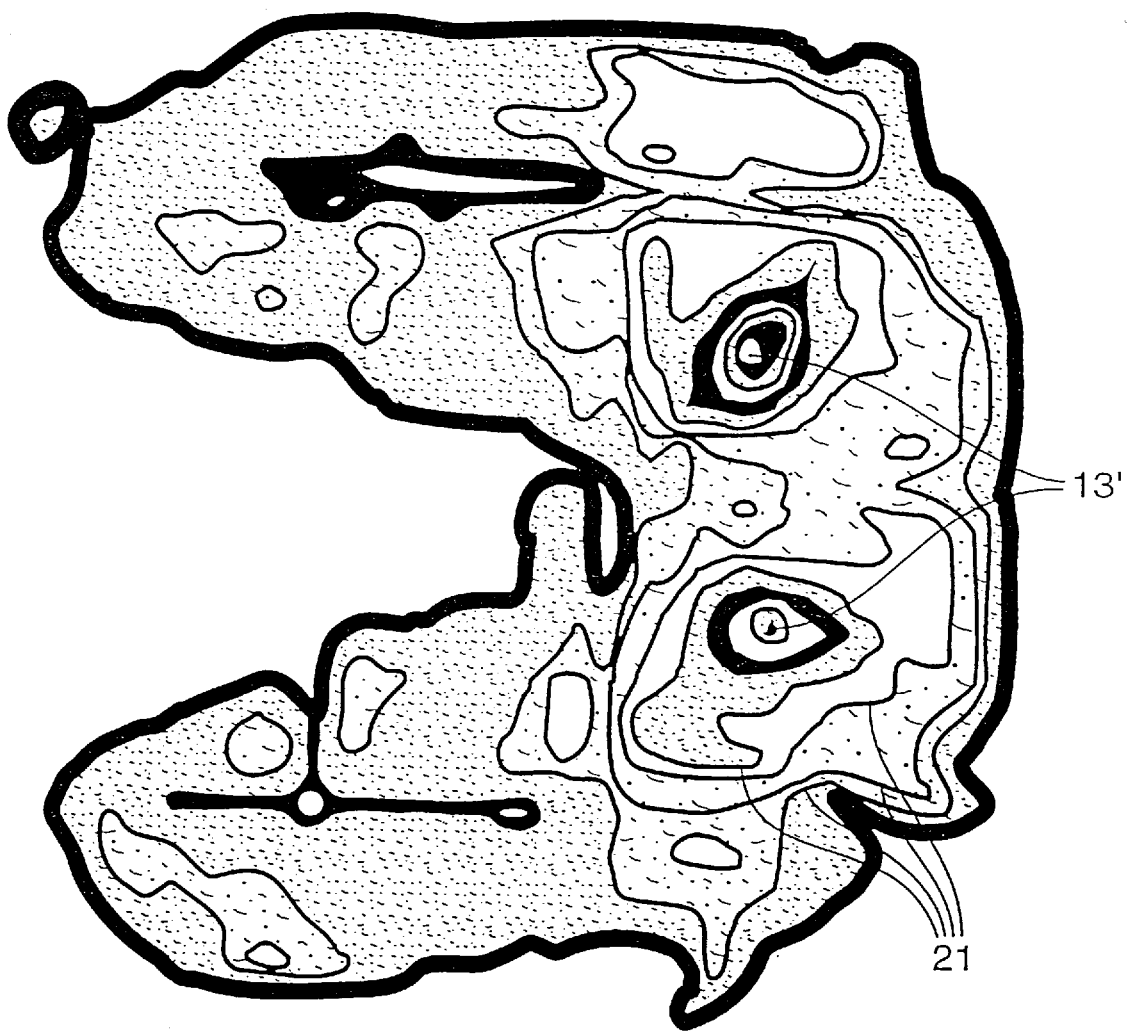
FIG. 5 is a family of isobars of a seat pressure distribution that can be determined with a measuring system according to FIG. 4.

By properly loading the seat cushion and using the applied pressure measuring mat 20, by means of the seat testing punch 1 on test machine 2 using suitable signal processing, the pressure distribution on the loaded seat surface can be displayed or output directly on a monitor or any other output unit. For example, the display can be in the form of a family of isobars 21 in a diagram as shown in FIG. 5. The diagram clearly shows the two pressure peaks 13' in the vicinity of the thigh supports that take up the main pressure. In a comfortable seat cushion, the pressure should decrease at these pressure peaks and be flat in the vicinity of the thighs.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A seat testing punch, comprising:

a pressure element which is upholstered and which points downward in a test position, said pressure element being placed on a seat cushion of a seat to be tested;

a transition element adjoining said pressure element at a top portion thereof in a test position, said transition element being insertable into a testing machine;

wherein shapes of hard parts forming said pressure element of the seat testing punch are modeled after a pelvis and thighs including hip joints of a human skeleton, at least with respect to an underside of the human skeleton which is subjected to loads when in a sitting position;

wherein joints of said pressure element which simulate hip joints are lockable such that said joints do not move under a test load;

wherein the upholstery of said pressure element also anthropomorphically simulates soft parts in a vicinity of a buttocks, such as muscle, connective, and fatty tissue according to a softness and local distribution of thickness; and wherein two sitting pressure points of the human buttocks and an immediate vicinity thereof are in particular simulated as naturally as possible with regard to a shape, position, hardness, and local hardness distribution by said pressure element and the upholstery in order to resemble the human skeletal and soft parts thereof.

2. The seat testing punch according to claim 1 wherein the upholstery of the pressure element comprises several elastic soft foam layers.

3. The seat testing punch according to claim 1, wherein the upholstery of the pressure element comprises several elastic soft foam layers having different thicknesses, said soft foam layers located closer to the pressure element and having a more extensive areawise coverage being thicker than said soft foam layers located further outward and having a smaller area coverage.

4. The seat testing punch according to claim 1, wherein the upholstery of the pressure element comprises several elastic soft foam layers having different densities and elasticities, said soft foam layers closer to the pressure element being made specifically lighter and softer than said soft foam layers located further outward.

5. The seat testing punch according to claim 1, wherein the upholstery of the pressure element is covered by a soft leather covering which simulates human skin with respect to flexibility.

6. The seat testing punch according to claim 1, wherein the upholstery of the pressure element is covered by a trouser material.

7. The seat testing punch according to claim 1, wherein said joints of the pressure element that simulate the hip joints in their mobility permit a position change of a simulated hip with respect to a simulated pelvis to a point where all such relative positions of the thighs and pelvis are simulated and preserved, such as those relative positions occurring during prolonged sitting by a human being;

wherein the upholstery has an intrinsic elasticity and flexible fastening to thigh simulations which allow the upholstery to follow said relative positions of the simulated thighs with respect to the simulated pelvis without destruction.

8. The seat testing punch according to claim 1, wherein said transition element abutting the pressure element at the top portion has a further joint which is lockable within limits of mobility in any desired intermediate position, said further joint comprising a pivot pin and clamping screw, by which clamping screw different inclinations of the seat testing punch with respect to a vertical loading direction are set.

9. A seat comfort testing punch, comprising:

a pressure element which is upholstered and which points downward in a test position, said pressure element being placed on a seat cushion of a seat to be comfort tested;

a transition element adjoining said pressure element at a top portion thereof in a test position, said transition element being insertable into a testing machine;

wherein shapes of hard parts forming said pressure element of the seat testing punch are modeled after a pelvis and thighs including hip joints of a human skeleton, at least with respect to an underside of the human skeleton which is subjected to loads when in a sitting position;

wherein joints of said pressure element which simulate hip joints are lockable such that said joints do not move under a test load;

wherein the upholstery of said pressure element also anthropomorphically simulates soft parts in a vicinity of a buttocks, such as muscle, connective, and fatty tissue according to a softness and local distribution of thickness; and wherein two sitting pressure points of the human buttocks and an immediate vicinity thereof are in particular simulated as naturally as possible with regard to a shape, position, hardness, and local hardness distribution by said pressure element and the upholstery in order to resemble the human skeletal and soft parts thereof.

\* \* \* \* \*